United States Patent [19]
Kobayashi

[11] Patent Number: 6,044,256
[45] Date of Patent: *Mar. 28, 2000

[54] TERMINAL DEVICE WITH DETECTOR

[75] Inventor: Takeshi Kobayashi, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,206

[22] Filed: Dec. 27, 1996

[30] Foreign Application Priority Data

Dec. 28, 1995 [JP] Japan ................................. 7-342151

[51] Int. Cl.$^7$ .................................................. H04M 11/00
[52] U.S. Cl. ........................ 455/404; 455/556; 359/152; 359/154
[58] Field of Search ...................... 455/404, 556, 455/557, 67.7, 66, 67.1; 379/56.1, 56.2, 56.3, 39, 44; 359/152, 154, 176, 146, 155; 340/539, 552, 565, 825.36, 825.37; 250/211, 341.1

[56] References Cited

U.S. PATENT DOCUMENTS

| | | | |
|---|---|---|---|
| 4,507,654 | 3/1985 | Stolarczyk et al. | 340/545 |
| 4,559,526 | 12/1985 | Tani et al. | 455/404 |
| 4,882,747 | 11/1989 | Williams | 359/146 |
| 4,949,074 | 8/1990 | D'Ambroisia et al. | 340/552 |
| 4,993,059 | 2/1991 | Smith et al. | 379/39 |
| 5,257,007 | 10/1993 | Steil et al. | 340/539 |
| 5,283,549 | 2/1994 | Mehaffey et al. | 340/521 |
| 5,334,972 | 8/1994 | Sugimoto et al. | 250/221 |
| 5,568,535 | 10/1996 | Sheffer et al. | 379/39 |
| 5,587,701 | 12/1996 | Hess | 379/44 |
| 5,617,236 | 4/1997 | Wang et al. | 359/176 |
| 5,636,264 | 6/1997 | Sulavuori et al. | 379/56.1 |
| 5,675,150 | 10/1997 | Kunz | 250/341.1 |
| 5,712,623 | 1/1998 | Kumai et al. | 340/565 |

FOREIGN PATENT DOCUMENTS

| | | |
|---|---|---|
| 569 686 | 11/1993 | European Pat. Off. . |
| 2 636 756 | 3/1990 | France . |
| 43 44 753 | 6/1995 | Germany . |
| 61-147663 | 7/1986 | Japan . |
| 63-222597 | 9/1988 | Japan . |
| 2-285277 | 11/1990 | Japan . |
| 5-112207 | 5/1993 | Japan . |
| 5-233868 | 9/1993 | Japan . |
| 6-62134 | 3/1994 | Japan . |

*Primary Examiner*—Dwayne D. Bost
*Assistant Examiner*—Quochien B. Vuong
*Attorney, Agent, or Firm*—Scully, Scott, Murphy & Presser

[57] ABSTRACT

A terminal device having an infrared optical communication circuit with improved efficiency in use of the infrared optical communication circuit and the terminal device itself. In a pocket telephone T as a terminal device, an infrared optical communication circuit includes a light emitting section for emitting infrared rays and a photo detector section for detecting the infrared rays. A controller compares the infrared rays emitted from the light emitting section with the infrared rays which are reflected by a reflecting plate and are detected by the photo detector section and detects the information of infrared ray interruption on the basis of the comparison result. The information of the infrared ray interruption can be transmitted from a radio transmitter-receiver circuit to another terminal device, is output as voices from an audio transmitter-receiver, is displayed on a display, or is stored in a memory circuit, resulting in enabling to detect a movement of a person or substance and improving efficiency in use of the terminal device.

5 Claims, 3 Drawing Sheets

TERMINAL DEVICE WITH DETECTOR

BACKGROUND OF THE INVENTION

The present invention relates to a terminal device having a radio communication system capable of carrying out a communication between terminals using an infrared optical communication system, and more particularly to a terminal device having a detector for the movement of a person, a substance, or the like using an infrared optical communication system.

Description of the Related Art

In recent years, there have been available terminal devices of a pocket telephone or other communication equipment, in which information can be mutually communicated between terminals using an infrared optical communication circuit. In one terminal device, the infrared optical communication circuit modulates information as optical signals and the modulated optical signals are transmitted from a light-emitting device. In the other terminal device, the transmitted optical signals are received in a photo detector and the received optical signals are demodulated to obtain the transmitted information in the infrared optical communication circuit.

However, when actually observing the situation in use of the terminal devices of this kind, the frequency in use of the radio communication is relatively high, but the frequency in use of the communication between the terminal devices using the infrared optical communication system is not so high. Hence, the efficiency in use of the infrared optical communication system supplemented in the terminal device is low, and its capabilities are not fully taken advantage of. After studying improvement of the efficiency in use of the infrared optical communication system many times, the present inventor has found that an open and close of a door, a movement of a person or substance, or the like can be detected using the infrared optical communication system, resulting in improving the capabilities of such terminal devices. In addition, after investigating a burglar prevention system to be built in the terminal device, the present inventor has considered that the infrared optical communication system can be used.

SUMMARY OF THE INVENTION

It is therefore an object of the present invention to provide a terminal device in view of the aforementioned disadvantages of the prior art, which is capable of using as a detecting device of a movement of a person, a substance or the like using an infrared optical communication system to improve efficiency in use of the infrared optical communication system and to more fully take advantage of the infrared optical communication system used in such terminal devices.

In accordance with one aspect of the present invention, there is provided a terminal device with a detector, including an infrared optical communication circuit having a light emitting section for emitting infrared rays and a photo detector section for detecting the infrared rays and being capable of communicating information with another terminal device using the infrared rays, comprising a comparison device for comparing the infrared rays emitted from the light emitting section with the infrared rays detected by the photo detector section to output a comparison result; and an output device for outputting information of an interruption of the infrared rays which are emitted from the light emitting section and are detected by the photo detector section on the basis of the comparison result of the comparison device.

Preferably, a terminal device further comprises a reflecting plate for reflecting the infrared rays emitted from the light emitting section to the photo detector section.

A terminal device can further comprise one of a radio transmitter-receiver section for transmitting the information of the infrared ray interruption as radio signals to a destination station; a voice processing section for converting the radio signals of the information of the infrared ray interruption into voice signals; an audio transmitter-receiver section for outputting voices corresponding to the voice signals output from the voice processing section; a display section for displaying the information of the infrared ray interruption: and a memory section for storing the information of the infrared ray interruption.

A terminal device with a detector can be used as a pocket telephone capable of communicating a telephone call with a destination station via a radio communication network and of mutually communicating information with another terminal device using infrared rays.

A terminal device with a detector can be used as a radio selection call receiver capable of outputting a call inform sound on the basis of a received call signal and of storing information.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
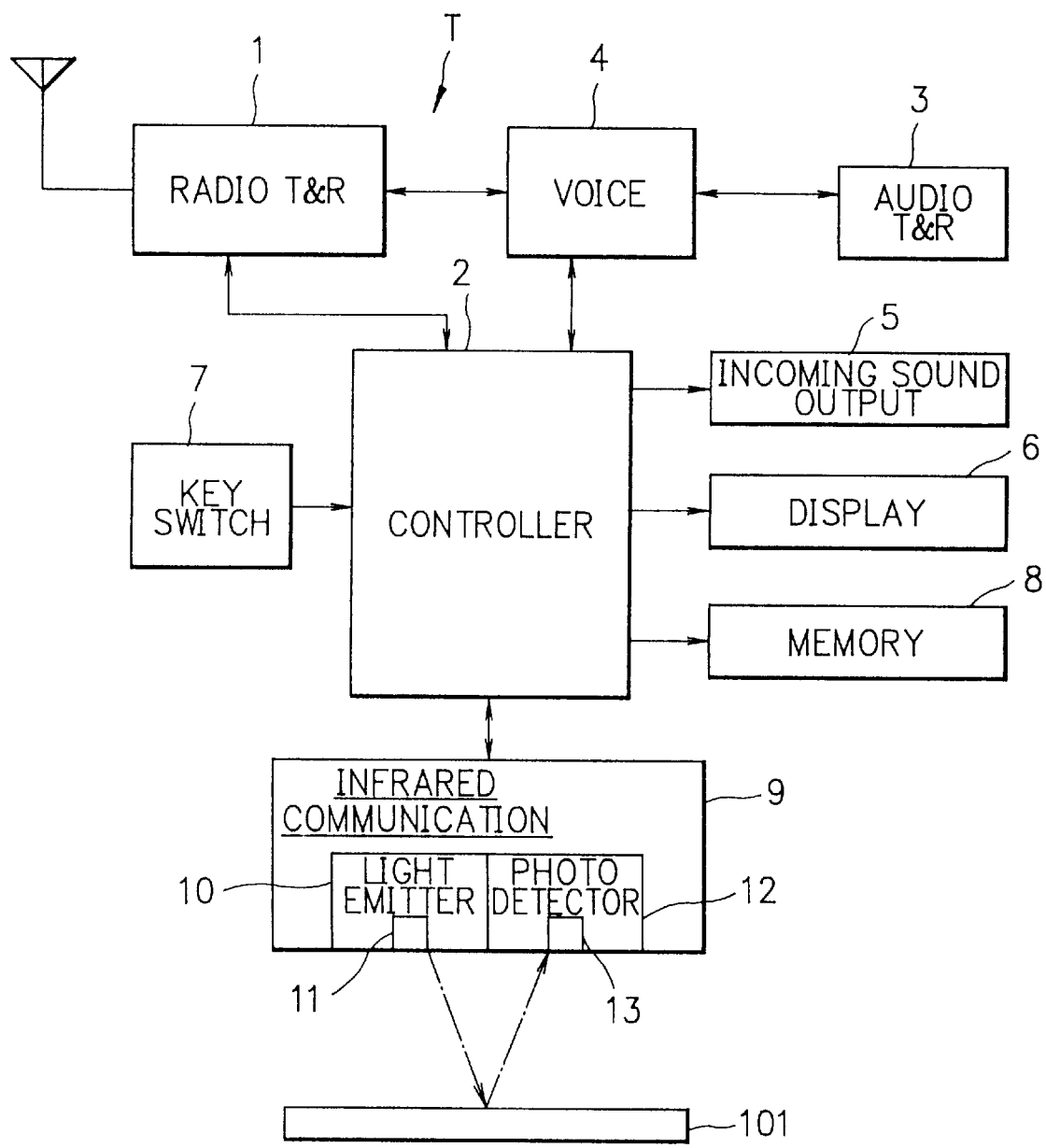
FIG. 1 is a schematic diagram showing a pocket telephone as a terminal device according to the present invention.

Referring now to the drawings, in FIG. 1, there is shown a pocket telephone T as a terminal device having an infrared optical communication system according to the present invention.

In FIG. 1, a radio transmitter-receiver circuit 1 is connected to radio stations and other terminals via a radio communication network. A controller 2 is connected to the radio transmitter-receiver circuit 1 and a voice processor 4. and the voice processor 4 is coupled to an audio transmitter-receiver 3. With the control of the controller 2, the voice processor 4 converts voice signals output from the audio transmitter-receiver 3 into radio signals, and the radio transmitter-receiver circuit 1 transmits the radio signals to a destination station. Further, the radio transmitter-receiver 1 demodulates received radio signals and the voice processor 4 converts the demodulated radio signals into voice signals. The audio transmitter-receiver 3 outputs the voice signals as voices. The controller 2 is also connected to an incoming sound output circuit 5 for informing with sound when an incoming call is received, a display 6 for displaying various information at the incoming call or the transmission, a key switch 7 for operating the telephone, and a memory circuit 8 for storing various information accompanied by the transmission and the reception.

The controller 2 is further coupled to an infrared optical communication circuit 9 which, for example, transfers the information stored in the memory circuit 8 to another terminal using infrared rays. The infrared optical communication circuit 9 also detects the infrared rays emitted from another terminal device and the detected information is stored into the memory circuit 8. The infrared optical communication circuit 9 has a conventional construction and the detail description thereof can be omitted for brevity. In the infrared optical communication circuit 9, a light emitting section 10 pulse-modulates the information read out of the memory circuit 8, and a light emitting device 11 emits infrared rays based on the pulse-modulated signals. A photo detector 13 of a photo detector section 12 detects the pulse-modulated infrared rays and pulse-modulates the detected signals to obtain the information.

The controller 2 includes a synchronism device for synchronizing a light emitting timing of the light emitting section 10 with a light detecting timing of the photo detector section 12 in the infrared optical communication circuit 9, a comparison device for comparing a pattern signal for modulating the infrared rays emitted from the light emitting section 10 with a pattern signal for demodulating the infrared rays detected by the photo detector section 12, and a discrimination device for discriminating whether or not the photo detector section 12 actually detects the infrared rays emitted from the light emitting section 10 using the synchronism device and the comparison device. It can be determined by the key switch 7 how to process the information resulting from the detection of the interruption of the infrared rays using the infrared optical communication circuit 9. This determination is carried out by selecting a processing program stored in the memory circuit 8.

Hence, with this pocket telephone, a telephone call is conducted with a destination station by radio communication. That is, voices of the audio transmitter-receiver 3 are processed in the voice processor 4 to obtain radio signals, and the radio transmitter-receiver circuit 1 transmits the radio signals to the destination station. The radio signals of the destination station, received in the radio transmitter-receiver circuit 1 are processed in the voice processor 4 to obtain the voice signals and the audio transmitter-receiver 3 outputs the voices. When an incoming call is received, the incoming sound output circuit 5 outputs an inform signal. Further, the selection of the destination station and other operations can be carried out by the key switch 7, and the various information accompanied by the transmission and the receive is stored in the memory circuit 8 and is displayed on the display 6.

Figure 2:
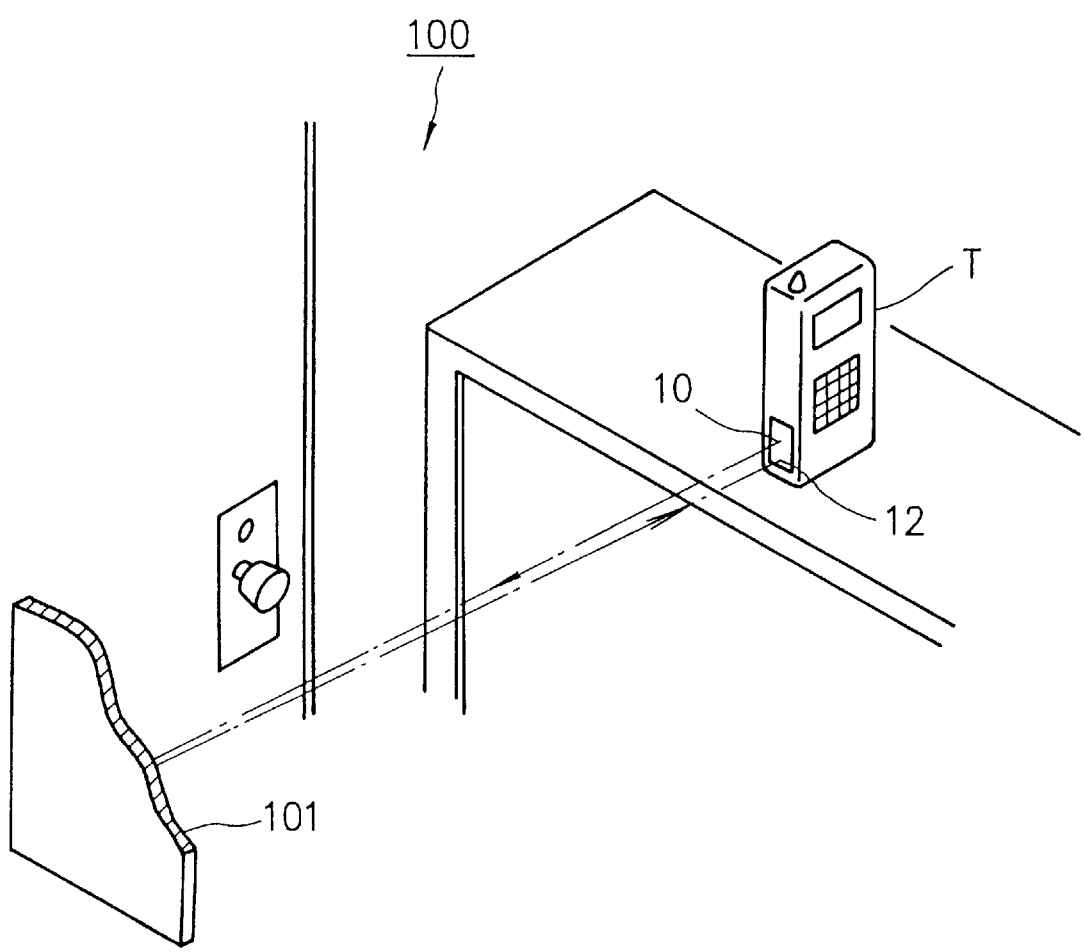
FIG. 2 is a schematic perspective view showing the pocket telephone shown in FIG. 1, used for a visitor detection.

The pocket telephone can be used as a detector for detecting, for example, a movement of a person, a substance or the like. For example, when a visitor is detected at an entrance 100, as shown in FIG. 2, the pocket telephone T is placed on one side of the entrance 100 so that the light emitting section 10 and the photo detector section 12 of its infrared optical communication circuit 9 may face the opposite side. A reflecting plate such as a mirror 101 is placed on the opposite side so as to face the infrared optical communication circuit 9. As a result, the infrared rays emitted from the light emitting section 10 of the infrared optical communication circuit 9 are reflected to the photo detector section 12 by the mirror 101 and the photo detector section 12 detects the reflected infrared rays. In the controller 2, a pattern signal obtained from the demodulated signals of the infrared rays detected by the photo detector section 12 is compared with a pattern signal of the modulated signals of the infrared rays emitted from the light emitting section 10, and the timings of both members are compared with each other, resulting in discriminating whether or not the photo detector section 12 really detects the infrared rays emitted from the light emitting section 10.

When a visitor comes to the entrance 100 and passes between the mirror 101 and the light emitting section 10 and the photo detector section 12 of the infrared optical communication circuit 9 in the pocket telephone T. the infrared rays are interrupted by the visitor, and the photo detector section 12 does not detect the infrared rays temporarily. The information of this infrared ray interruption is detected by the infrared optical communication circuit 9 and is then transferred to the controller 2. The controller 2 judges "A visitor came." and executes the necessary processing. This processing is performed, that is, an instruction is previously input from the key switch 7, and a program stored in the memory circuit 8, i.e., the instruction is read out to implement the instructed operation.

Figure 3:
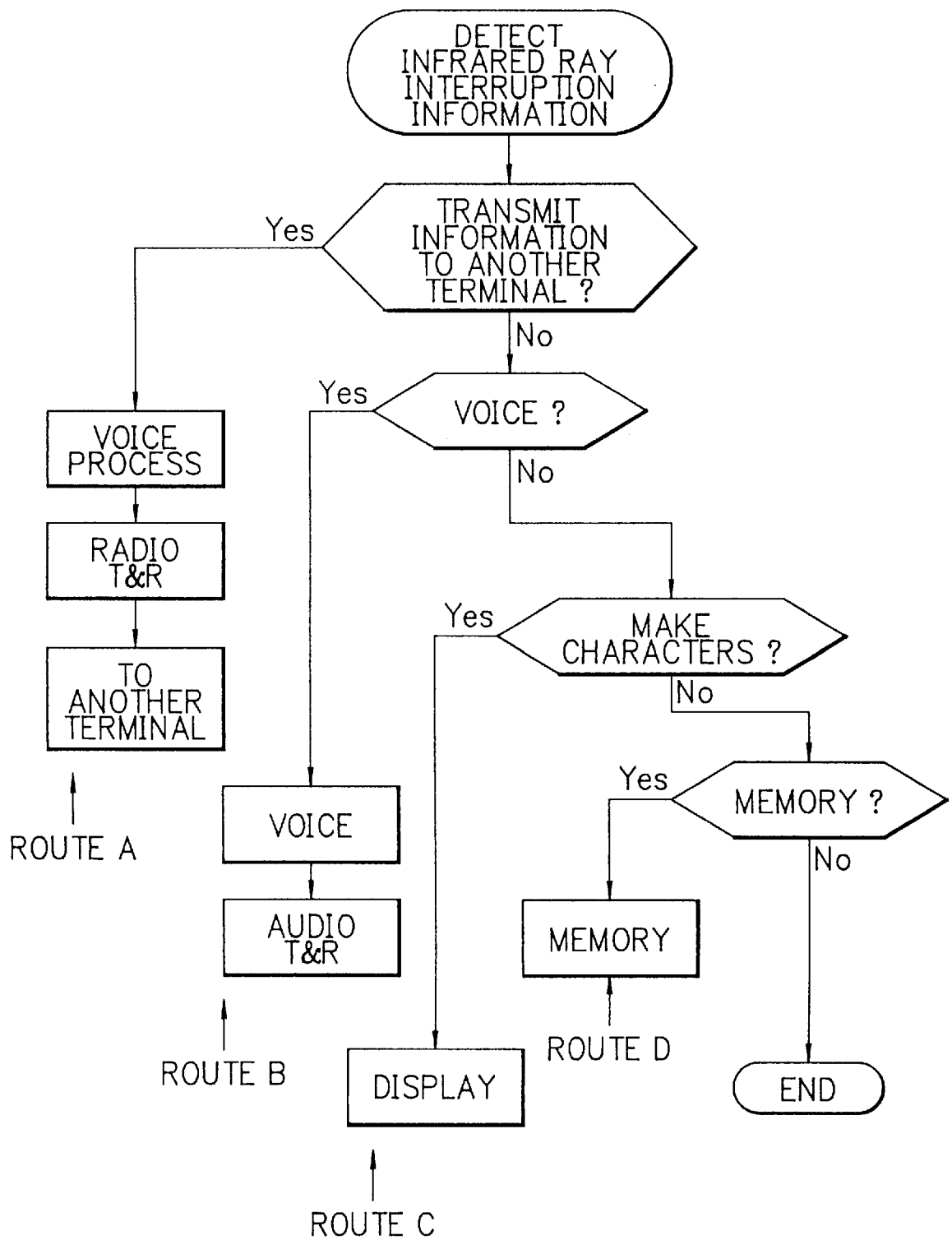
FIG. 3 is a flow chart showing a detection operation and an information processing operation according to the present invention.

The controller 2 outputs the instructed operation to the related parts. One example of this operation will be described with reference to a flow chart shown in FIG. 3. That is, when the information of the infrared ray interruption is transmitted to another terminal device via radio communication, as shown in a route A, a predetermined message such as "A visitor came." read out of the memory circuit 8 is converted to the voices in the voice processor 4 and is transferred to the radio transmitter-receiver circuit 1, and the information of the infrared ray interruption is transmitted to another pocket telephone. As a result, another pocket telephone placed apart from the detecting pocket telephone receives the transmitted information and a person present in a remote position can know that a visitor has come.

On the other hand, when the information of the infrared ray interruption is shown by the voices, as shown in a route B, a predetermined message read out of the memory circuit 8 is converted to the corresponding voice signals in the voice processor 4 and the audio transmitter-receiver 3 outputs the voices. When staying at a place from where the pocket telephone is not seen but near the pocket telephone, what a visitor has come is known by the voices output from the audio transmitter-receiver 3. Further, although in actually less cases, when the information of the infrared ray interruption is displayed by characters or symbols on the display 6, as shown in route C, a predetermined message read out of the memory circuit 8 is displayed on the display 6. BY looking at the display 6, even when the entrance is not directly watched, when a visitor has come can be known.

Moreover, in the case of being not at home, when the information of the infrared ray interruption is recorded so as to know later that a visitor came, as shown in route D, a predetermined message read out of the memory circuit 8 is stored in a predetermined address in the memory circuit 8, and the stored information can be read out of the memory circuit 8 later. As described above, this pocket telephone can be used as a detector of a movement of a person using the infrared optical communication circuit 9, resulting in expanding the range in use of the pocket telephone and improving the efficiency in use of the same.

Although the present invention has been described with reference to a detection of a coming visitor, in consideration of a fact that a person or substance passing between the pocket telephone and a reflecting plate can be detected, the pocket telephone can be used for various applications such as a monitor of an intruder or the like. When a door glass is used as a reflecting plate, an open and close of a door can be detected. On the other hand, in the case that the pocket telephone is positioned so that the infrared optical communication circuit may be placed so as to face a mirror surface, when the pocket telephone is moved, by using that the photo detecting condition is changed, this combination of the pocket telephone and the mirror can be used as a burglar prevention system of the pocket telephone itself. Alternatively, when the mirror is attached to a substance such as a bag or the like, the combination can be used for a burglar prevention system of the bag or the like.

Furthermore, although the present invention has been described with reference to the radio pocket telephone, if a transmitter of the information of the infrared ray interruption is not required in another terminal device, as shown in the route A. the present invention can be applicable to a radio selection call receiver or other terminal devices having an infrared optical communication circuit.

As described above, according to the present invention, a terminal device is provided with a comparison device for comparing the infrared rays emitted from the light emitting section with the infrared rays detected by the photo detector section in the infrared optical communication circuit to output a comparison result, and an output device for outputting the information of the interruption of the infrared rays which are emitted from the light emitting section and are detected by the photo detector section on the basis of the output of the comparison device. The infrared optical communication circuit can detect the information of the movement of a person or a substance on the basis of the information of the infrared ray interruption and monitor the variation of the information around the terminal device. As a result, the terminal device can be used as a monitor device and a burglar prevention device. Further, the information of the output device is transmitted to another terminal device, is informed as the voices within its own system, is displayed on the display, or is stored in the memory circuit, and terminal device can expand its range in use and improve its efficiency in use.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An infrared communication device comprising:

an infrared optical communication circuit for communicating information with another infrared communication device using infrared rays, the infrared optical communication circuit having a light emitting section for emitting infrared rays and a photo detector section for detecting the infrared rays;

a comparison device for comparing the infrared rays emitted from the light emitting section with the infrared rays detected by the photo detector section to output a comparison result; and an output device for outputting information of an interruption of the infrared rays detected by the photo detector section on the basis of the comparison result of the comparison device.

2. The infrared communication device of claim 1, further comprising a reflecting plate for reflecting the infrared rays emitted from the light emitting section to the photo detector section.

3. The infrared communication device of claim 2, wherein the output device is selected from a group consisting of:

a radio transmitter-receiver section for transmitting the information of the infrared ray interruption as radio signals to a destination station;

a voice processing section for converting the information of the infrared ray interruption into voice signals;

an audio transmitter-receiver section for outputting voices corresponding to voice signals output from a voice processing section;

a display section for displaying the information of the infrared ray interruption; and a memory section for storing the information of the infrared ray interruption.

4. The infrared communication device of claim 3, wherein the infrared communication device is a portable telephone capable of communicating a telephone call with a destination station via a radio communication network and of mutually communicating information with another infrared communication device using infrared rays.

5. The infrared communication device of claim 3, wherein the infrared communication device is a radio selection call receiver capable of outputting a call inform sound on the basis of a received call signal and of storing information.

* * * * *